ABSTRACT OF THE DISCLOSURE

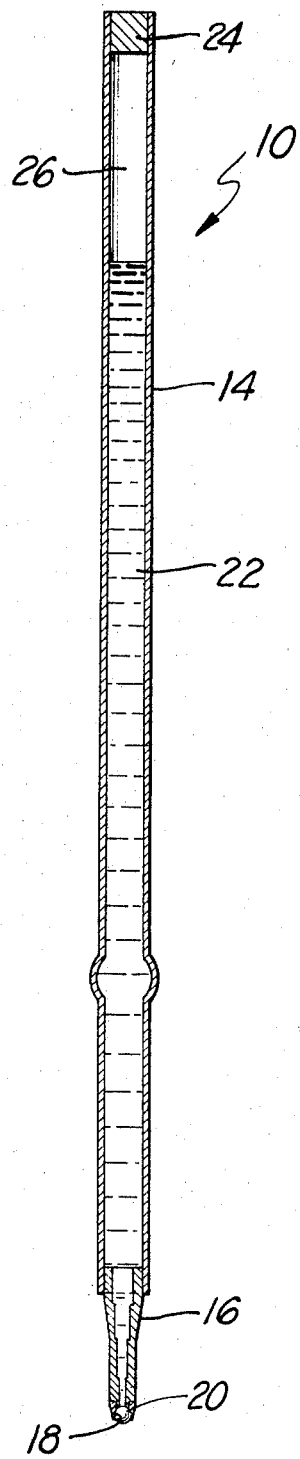
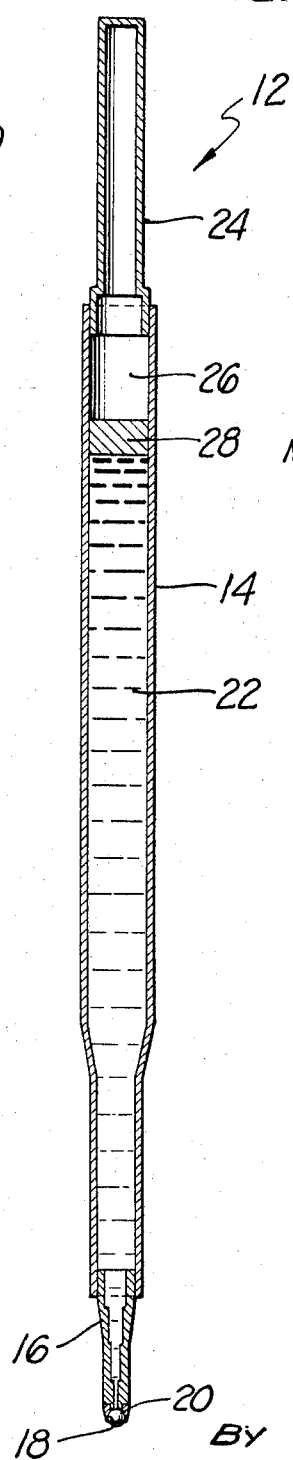
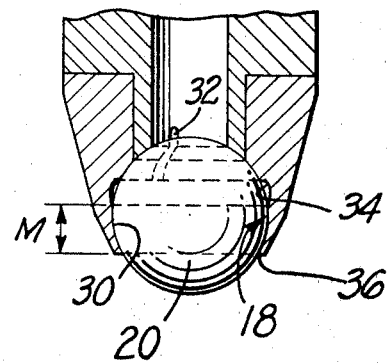
INVENTORS
PAUL C. FISHER,
HERMAN SCHUB,
ROGER A. KENNEDY,
BY EDWARD D. O'BRIAN
ATTORNEY 3,425,779
PRESSURIZED MARKING INSTRUMENT
Paul C. Fisher, 14226 W. Greenleaf St., Sherman Oaks, Calif. 91403, and Herman Schub, Chicago, and Roger A. Kennedy, Addison, Ill.; said Schub and said Kennedy assignors to said Fisher
Continuation-in-part of application Ser. No. 576,721, Sept. 1, 1966. This application July 24, 1967, Ser. No. 660,155
U.S. Cl. 401—190                                9 Claims
Int. Cl. B43k 7/00, 7/10; C09d 11/18

A ball point writing and/or marking instrument is disclosed. This instrument has a sealed marking fluid reservoir, a ball socket located in an extremity of the reservoir so as to extend between the interior and the exterior of the reservoir, a ball rotatably mounted in the socket so as to extend between the interior and exterior of the reservoir, a marking fluid in the reservoir in contact with the ball, and a pressurized gas within the reservoir forcing the marking fluid into contact with the ball. The marking fluid comprising a mixture of at least one solvent, at least one coloring agent and at least one polymer which is "soluble" with the solvent and which, in conjunction with the other ingredients within the fluid, causes the marking fluid to be viscoelastic and to have strong adhesive and strong cohesive characteristics and to flow resistant in character. The marking fluid has a high viscosity; it is capable of wetting the surface of the ball and forming on the ball a film which is sufficiently flow resistant so that when the ball is at rest the marking fluid does not ooze out of the reservoir. However, this film is capable of being transferred from the ball to a receiving surface when the ball is located by contact with such a surface without being visibly disrupted by contact with the entrance to the ball socket.

CROSS REFERENCES TO RELATED APPLICATIONS

This application is related to and is a continuation-in-part of the co-pending application Ser. No. 576,721, filed Sept. 1, 1966, entitled "Pressurized Marking Instrument"; co-pending application Ser. No. 461,256, filed June 4, 1965, entitled "Pressurized Ball Point Writing Instrument and Ink Therefor"; and co-pending application Ser. No. 508,255, filed Nov. 17, 1965, entitled "Pressurized Ball Point Writing Instrument and Ink Therefor." The entire disclosures of all these applications are incorporated herein by reference. All of these applications are abandoned.

BACKGROUND OF THE INVENTION

Many different ball point writing and/or marking instruments have been designed and utilized. All of such instruments are considered and/or believed to have had a fluid reservoir, a ball socket located at an extremity of the fluid reservoir, a ball located within the ball socket and a supply of fluid located within the reservoir in contact with the ball. It is considered that all of such instruments have been used by applying the ball to a surface and moving the ball along the surface so that the frictional contact of the ball with the surfaces causes the ball to rotate in the socket in such a manner as to transfer fluid from the interior of the reservoir to the surface.

A number of problems have been encountered with many of these different ball point writing and/or marking instruments. A major difficulty limiting the acceptability of ball point writing and/or marking instruments as compared to other writing and/or marking instruments concerns the accumulation of fluid on the exterior of the ball socket adjacent to the ball itself. Such accumulations tend to be unsightly and messy. It is considered that principally they have resulted either from untransferred fluid tending to scrape off the ball surface during use of the writing and/or marking instrument as the ball is rotated or from oozing of the fluid from within the interior of the reservoir around the ball between it and the interior of the socket, or both of these.

In so-called capillary feed type ball point writing and/or marking instruments the last of these factors has generally been nonexistent or of comparatively limited significance. This is because in such instruments the reservoir, the ball and the ball socket are designed so that a combination of capillary action (including surface tension properties) and gravity is utilized so as to supply ink or fluid to the ball during the operation of the writing and/or marking instrument. With this type of structure the reservoir is normally open to the atmosphere in order that air can fill the space vacated as ink or fluid is used. Such instruments, however, tend to suffer from an inherent limitation. Because of the balancing of forces used in conjunction with the ink or fluid supplying action, generally they will only write to a limited extent if the reservoir is not above the ball.

Because of this type of problem so-called pressurized cartridge ball point writing and/or marking instruments have been proposed. In these instruments ink or fluid is held under pressure so that it is in constant contact with the ball and the ball socket of the writing and/or marking instrument. Because of the pressure used to hold the ink or fluid in this manner the forces of gravity are not significant as far as supplying the ink or fluid to the writing and/or marking point is concerned. As a consequence of this it has been considered that pressurized writing and/or marking instruments could be used at any angle, whereas prior related ball point writing and/or marking instruments could not be effectively used in this manner. Also it has been considered that such pressurized instruments would be advantageous in eliminating problems of ink or fluid leaking directly from the ink reservoir since in them the reservoir would not be open to the atmosphere.

The pressure on the ink or fluid within such a pressurized cartridge writing and/or marking instrument, however, has caused difficulty. Such pressure tends to promote oozing of conventional ink compositions through the area between the ball and the ball socket in this type of instrument. As indicated in the Cofield U.S. Patent 3,099,252, increasing the viscosity of an ink or ink composition does not per se prevent oozing; it merely reduces the rate at which oozing occurs. A pressurized cartridge instrument using a conventional type of ink is also considered to be subject to the accumulation of ink on the outside of the ball socket as the result of use of the instrument because of the wiping action of the edge of the ball socket as the ball is rotated during use.

The particular Cofield patent indicated teaches that the oozing phenomena discussed can be controlled through the use of a specialized ink composition having its rheological properties controlled so that the ink composition has a yield value produced by a pigment concentration in the ink. This patent further indicates that even with such an ink it is necessary to control the pressure on the ink in such a manner that the ink will flow in the reservoir without oozing between the ball and the socket of the writing instrument. In other words just the right amount of pressure should be used with this particular type of ink composition to cause flow, for if too much pressure is used the ink, in spite of its yield value, will ooze from the interior of the writing instrument. This Cofield patent teaches achieving the pressure used through the use of a gaseous-liquid mixture of a particular type of compound. Such a mixture will exert significantly different pressures inside the cartridge at different temperatures.

This is considered to be quite significant. Generally speaking, any writing and/or marking instrument to be commercially acceptable must operate satisfactorily at any temperature within the range of normally encountered ambient temperatures. Such a range is frequently considered to be from about −10° C. to about 50° C. It will be recognized that the pressure exerted against the ink or fluid supply within the reservoir of a ball point pen by any given absolute quantity of a gas will very significantly within this range of temperatures, and that therefore an ink which may ooze at one temperature may not at another temperature.

Inasmuch as oozing as caused by pressure is essentially a matter of the pressure differential between the inside and the outside of a pressurized cartridge writing instrument it will be apparent that another factor must be taken into consideration in addition to the pressure differentials cause by temperature. This other factor is that writing instruments of the type discussed are apt to be used at normal atmospheric pressures at sea level or slightly above which are about 14.7 p.s.i. They are also apt to be used at comparatively high altitudes where the atmospheric pressure is apt to be as low as 10 p.s.i. To be effective a pressurized cartridge ball point marking or writing instrument must not ooze when subjected to any of these pressure differentials regardless of the ambient temperature.

From this it will be seen that at the time of this invention the pressurized cartridge ball point marking instrument field was faced with the problem as to providing instruments of this type which did not ooze ink or other marking fluid around the writing ball because of the pressure differential between the interior and the exterior of an instrument. This field was also faced with the problem of effectively eliminating deposits of ink or the like at the writing tip of such an instrument resulting from ink being scraped off of the ball surface during the use of the ball for writing purposes. These problems have not been the only problems in this field. The field has been concerned with the need for maintaining good writing qualities—such as ease of use of a writing instrument and good line quality. All of these problems are interrelated to the ever present need to maintain comparatively nominal manufacturing costs.

SUMMARY OF THE INVENTION

This invention is concerned with elimination of problems of ink or fluid deposits or accumulations at the exterior of pressurized cartridge ball point writing and/or marking instruments as a result of oozing and scraping phenomena as discussed in the preceding. It is also concerned with instruments of this type which operate effectively under normally encountered temperature and pressure conditions and yet which are of such a character that the pressurization within these instruments need not be controlled in a comparatively precise manner as indicated in the prior art as discussed in the preceding. These various accomplishments of this invention are interrelated to providing writing or marking instruments of the type described which may easily be used, and which give satisfactory performance, and which can be manufactured at a comparatively nominal cost.

By way of summary, it will be indicated that the invention concerns ball point writing and marking instruments, each of which has various desirable properties and/or characteristics as are indicated in the preceding paragraph, and structurally each of which has a sealed marking fluid reservoir, a ball socket located at an extremity of the reservoir so as to extend between the interior and exterior of the reservoir, a ball rotatably mounted in the socket so as to extend both into the interior of and the exterior of the reservoir, a marking fluid in the reservoir in contact with the ball, a pressurized gas means located within the reservoir forcing the marking fluid into contact with the ball, and is characterized by the marking fluid being a viscoelastic, high viscosity composition having strong adhesive and strong cohesive characteristics, said marking fluid being capable of wetting the surface of said ball and forming on the surface of said ball a film which is sufficiently flow resistant so that said means is substantially incapable of forcing marking fluid from the interior of said reservoir to the exterior of said reservoir between said ball and the interior of said ball socket when said ball is at rest, said marking fluid also being capable of wetting the surface of said ball and forming on the surface of said ball an adherent, cohesive film which is not visibly disrupted by contact with the entrance to said ball socket on the exterior of said reservoir upon rotation of said ball, such film being capable of being transferred from said ball to a marking fluid receiving surface, said marking fluid comprising a mixture of at least one solvent, at least one coloring agent and at least one polymer which is "soluble" within the solvent and which, in conjunction with the other ingredients of the marking fluid, causes the marking fluid to have properties as indicated.

The invention is, of course, much more fully and completely described in the remainder of this specification and is more precisely defined by the appended claims forming a part of this disclosure.

BRIEF DESCRIPTION OF THE DRAWING

The actual details of this invention are best described by referring directly to the accompanying drawing in which:

FIG. 1 is a cross-sectional view of one embodiment of a pressurized ball point marking instrument, or cartridge, of this invention;

FIG. 2 is a cross-sectional view similar to FIG. 1 of another embodiment of a ball point marking instrument, or cartridge of this invention; and FIG. 3 is an enlarged cross-sectional view showing a ball and a ball socket as indicated in both of the two preceding figures.

DETAILED DESCRIPTION OF THE DRAWING

In FIGS. 1 and 2 there are shown marking or writing instruments or cartridges 10 and 12, respectively, which are substantially the same except as hereinafter indicated. For convenience both of these instruments are described together herein because of the similarities of their structures. Each of the cartridges 10 and 12, while capable of being used alone as a writing instrument, is primarily intended to be used together with a housing and other conventional auxiliary structures as a part of a more complete ball point pen.

The cartridges 10 and 12 each include an elongated tubular reservoir 14. The reservoir 14 in the instrument 10 is of comparatively small diameter as compared to the reservoir 14 in the instrument 12. Each of the reservoirs 14 carries a sleeve 16, the lower end of which is formed as a ball socket 18. Each of the sockets 18 embraces and carries a ball 20 which is in communication with the interior of the corresponding reservoir 14 by virtue of being mounted on the sleeve 16. A quantity of marking or writing fluid such as an ink 22 is within each of the reservoirs 14 by virtue of being mounted on the sleeve 16. A quantity of marking or writing fluid such as an ink 22 is within each of the reservoirs 14 in the cartridges 10 and 12. The ends of these cartridges remote from the sleeves 16 are sealed by plugs 24. It will be noted that the plug 24 with the cartridge 10 essentially appears a block of material while the plug in the cartridge 12 appears essentially as an inverted cap or cup.

In the cartridge 10 the ink 22 is separated from the plug 24 by a quantity of pressurized gas 26 which bears directly against the marking fluid 22 so as to tend to force it or pressurize it in such a manner that it is in constant contact with the ball 20. In the cartridge 12 the gas 26 is also adjacent to the plug 24, but is separated from the fluid 22 by means of what may be loosely referred to as a piston 28. This piston 28 is not used in the cartridge 10; it fits closely against the interior of the reservoir 14 in the cartridge 12 so as to effectively separate the fluid 22 from the gas 26 as the quantity of fluid within the reservoir 14 is lowered as a result of use.

The use of the piston 28 in the cartridge 12 is considered necessary because of the larger diameter of the reservoir 14 of this cartridge than the diameter of the reservoir 14 of the cartridge 10. In the cartridge 10 the diameter of the reservoir 14 is preferably such that because of surface tension and wetting of the fluid 22 a meniscus is formed on the extremity of the fluid 22 adjacent to the gas 26 which effectively separates the fluid 22 and the gas 26 as the fluid is removed from the cartridge 10 by traveling along the length of the reservoir 14. Because of this type of action the cartridge 10 is of a type commonly referred to as a "capillary" cartridge. A suitable cartridge of this type may have a diameter of about 0.103 inch. The diameter of the reservoir 14 in the cartridge 12 is greater than this, and because of its size is such that a meniscus is not formed which is sufficiently strong to effect separation of the gas 26 and the ink 22. Hence, the piston 28 is used for this purpose.

In both of the cartridges 10 and 12 the ball sockets 18 and balls 20 are formed as indicated in FIG. 3 of the drawing. Here it will be seen that the ball socket 18 in such a cartridge has an interior spherically shaped surface 30, the upper portion of which adjacent to a reservoir 14 is provided with a plurality of grooves 32 serving as ink or marking fluid feeding channels. In the structure shown in FIG. 3 these grooves terminate within the surface 30 in another groove 34 used for fluid distributing purposes located in an imaginary plane perpendicular to an imaginary line drawn through the centers of the reservoir 14 and the sleeve 16 and the ball socket 18. The ball socket 18 illustrated terminates in an edge 36 which also extends in such an imaginary plane. The ball 20 fits within the socket 18 so as to be held by the surface 30 indicated in FIG. 3 in order to project from the edge 36.

With this construction the distance indicated by the line marked by the letter M is what is commonly referred to as the writing fluid or ink metering band of a writing instrument such as the cartridge 10 or 12. It is presently considered that for acceptable results the length of this metering band measured along the curvature of the ball 20 between the groove 34 and the edge 36 should be at least 100 microns in length and that within this band each side of the ball 20 should be spaced from the interior if the socket 18 by a distance of from about 2 to 12 microns. This amount of clearance should be varied depending upon the thickness of the film to be applied with a cartridge such as the cartridge 10 or 12.

Generally speaking if the clearance between the ball 20 and the socket 18 is less than about this 2 micron dimension the film applied to the ball 20 during the use of a particular instrument or cartridge will be too thin to create a satisfactory, continuous, easily visible deposit of ink upon a writing surface. On the other hand if the clearance between the ball 20 and the socket 18 within this metering band is greater than about 12 microns, it is considered that the ball 20 during use will tend to move back and forth within the socket 18 so that the film of ink or marking fluid on the surface of the ball will not be uniform as desired in writing a line of uniform intensity. If this spacing is too great there also may be a tendency for an instrument to lay down a line of ink which is so thick that it may be undesirably slow in drying. In a similar manner it is considered that if the length of the metering band is less than 100 microns a uniform film will not be applied to the surface of the ball 20 by rotation of it. Further, if this dimension is less than the value indicated, it is considered that the ball 20 will not be held by the socket 18 with sufficient firmness for satisfactory writing characteristics.

Both of the cartridges 10 and 12 may be formed out of conventional materials as are used in the construction of present day, existing ball point writing instruments. The sleeve 16 (including the socket 18) may also be formed out of such materials. Similarly, a ball 20 used in either of these instruments may be formed in various known manners out of various known materials for use as ball points in writing or marking instruments of the type to which this invention pertains. Thus, the ball used as a ball 20 in a writing instrument of this invention may be of stainless steel, tungsten carbide, jewels, hard ceramics, or the like, and the surfaces of these balls may be either smooth or textured to provide for increased writing friction ink adherence.

The piston 28 used in the cartridge 12 may be of any convenient material which is inert with respect to the gas 26 and the ink 22 or marking fluid employed in this cartridge. Such a piston 28 may, as shown, be a block of a metal or common polymeric solid such as polyethylene, a synthetic rubber, or the like. If desired, in order to facilitate movement of such a block the surface of it may be coated with a conventional inert lubricant such as a silicone grease. Although it is not preferred, a small quantity of a grease such as a silicone grease which is not detrimental to the ink 22 may be used as the piston 28.

An important aspect of the present invention is the fact that the pressure of the gas 26 may be varied within extremely wide limitations, and that the nature of the gas employed is not critical so long as the particular gas used is inert or substantially inert with respect to the materials contacted by it within a specific cartridge. Because of these factors it is considered that the manufacture of a cartridge such as the cartridges 10 and 12 is simplified since it is not necessary to exercise special care to have any precise degree of pressurization just sufficient to cause flow without causing oozing as is required in the pressurized ball point writing instruments as set forth in the Cofield U.S. Patent 3,099,252. Among the gases which may be suitably employed are air, carbon dioxide, nitrogen, helium and other commonly available gases including various chlorine and fluorine substituted derivatives of methane.

Generally speaking, it is considered that a quantity of gas 26 should be used in a cartridge such as the cartridge 10 or 12 as it is manufactured which will provide for a minimum pressure of the gas within the cartridge when the ink or marking fluid supply within the cartridge is exhausted or substantially exhausted of at least 1.0 p.s.i.g. at −10° C. It is considered that normally at least this amount of pressure is necessary in order to move and hold the fluid 22 within a cartridge into contact with the portion of the ball 20 generally on the inside of the socket 18 and in order to move the ink or fluid into grooves such as the grooves 32 and 34 previously described.

The initial pressure of a quantity of gas within a cartridge necessary to establish this final pressure will, of course, vary depending upon the quantity of gas initially used and the dimensions of the cartridge. From the material given herein such pressure may be readily calculated for any specific cartridge. Although the minimum pressure in a used cartridge of 1.0 p.s.i.g. is specified herein, it will be recognized from subsequent portions of this specification that within the scope of this invention it is possible to formulate various "hard to move" inks or marking fluids which may require higher pressures than this value if they are to be used in a cartridge such as the cartridge 10 or 12.

It is presently considered that the initial pressure in a cartridge such as the cartridge 10 or 12 should not exceed about 200 p.s.i.g. at 25° C. for practical reasons which are unrelated to the essential character of this invention. Generally speaking when higher pressures than this are used there is danger of a cartridge blowing up because it is not sufficiently resistant to high internal pressure. There is also the collateral danger with pressures above this value that a ball such as the ball 20 will be blown from its socket such as the socket 18. Such danger is particularly present if a cartridge is heated above the normal range of ambient temperatures.

Another important aspect of the invention pertains to the character of the writing or marking fluid 22 used in a cartridge such as either of the cartridges 10 or 12. Normally such a marking or writing fluid will be an ink composition, but on occasion such a marking or writing fluid may be of a specialized character adapted to apply an ink-like or similar or related film for specialized applications. As indicated in the preceding, the marking or writing fluid used should be of a viscoelastic, strong adhesive, strong cohesive, film-forming character, and should normally contain at least one ingredient of each of three different types of ingredients, these ingredients coacting together to provide the desired properties in the marking fluid.

These physical properties are considered to be very important to the present invention, and the invention to a significant degree is considered to relate to the recognition of these properties, and the fact that pressurized cartridge ball point writing instruments having marking or writing fluids with these properties can be used without significant or noticeable amounts of the writing fluid oozing through the space between a ball such as the ball 20 and the interior of a ball socket such as the socket 18, and without significant or noticeable quantities of the marking fluid accumulating on the exterior of a ball socket such as the socket 18 as a result of use of the instrument.

The viscoelastic characteristics indicated in the preceding discussion are relatively difficult to precisely define because of various factors in the field of rheology which are not considered important in understanding the present invention. The phenomenon known as viscoelasticity is defined in the text "Textbook of Polymer Science: by Billmayer, Interscience Publishers, New York, N.Y., copyright 1962, as follows (page 172):

"Viscoelasticity, where the deformation of the polymer specimen is reversible but time dependent, and is associated (as in rubber elasticity) with a distortion of polymer change from their equilibrium conformations through activated segment motion involving rotation about chemical bonds."

From this definition it will be seen that the viscoelastic marking or writing fluids of this invention are to be contrasted with compositions such as rubber and other pure elastomers which are elastic in the sense that once distended they will return to an initial configuration, even if they have been held in a distended configuration for a long period. Thus, if a common rubber band exhibiting this rubber-like elasticity is stretched and held stretched for a significant time interval it will when released go back to its initial configuration or substantially its initial configuration. A viscoelastic composition will not so return after such a time interval.

These viscoelastic writing or marking fluids of the invention are also to be contrasted with materials exhibiting Hookean elasticity. In such materials the amount of deformation is assumed to be proportional to the deforming forces. Most metals and related solids exhibit this type of elasticity within their elastic range. The viscoelastic marking or writing fluids herein defined are rubber-like in character in that they are of an elastic nature and, indeed, may be directly compared with various types of elastomeric compositions such as common rubber cements. However, their elasticity is time dependent, and thus they do not obey in an absolute manner Hock's law with respect to deformation.

As a practical matter it can be determined whether or not a marking or writing fluid has viscoelastic characteristics or properties as desired with this invention by a rather simple test. In this test a flat-bladed spatula is inserted within a body of a marking or writing fluid and is twisted a fraction of a turn about its axis. Such a spatula or similar instrument will remain in the position to which it is turned after being held in this position for a significant time interval such as ten minutes if the fluid is viscoelastic, but will tend to return to or towards its initial position if immediately released after being turned. The tendency of the spatula or similar instrument to move toward its original position when immediately released in this test is considered to demonstrate elastic characteristics whereas the tendency of the spatula or similar instrument to remain in place after being held for a time interval is considered to demonstrate that the fluid or composition is not truly elastic in an absolute sense, but that it possesses viscoelastic characteristics. The term "viscoelastic" in and of itself indicates that marking or writing fluids designated by this term have a viscosity.

It is considered that these marking or writing fluids of this invention in order to perform satisfactorily must have a relatively high viscosity. It is considered that such viscosity in terms of its apparent viscosity should be at least 50,000 cps. when measured at 25° C. at 0.3 r.p.m. with a number 5 cylindrical spindle on a Brookfield LVT Viscometer. At viscosities less than about 50,000 cps., measured as indicated, it has been found that marking or writing fluids which otherwise possess desired characteristics as herein indicated will tend to accumulate in an undesired amount on the outside of the ball socket when used and when not in use will tend to ooze an undesired amount around the ball such as the ball 20 in a cartridge such as the cartridge 10 or 12.

In general, the higher the viscosity of a writing and marking fluid of this invention, the less the tendency for such a fluid to ooze in this manner. For this reason it is presently preferred that the bulk viscosity of a writing and marking fluid of this invention be above at least 1,000,000 cps. when measured at 25° C. at 0.3 r.p.m. with a number 5 spindle on a Brookfield LVT Viscometer. It will be recognized that viscosity measurements in the range of 1,000,000 to above 4,000,000 cps. are difficult and relatively inaccurate with such equipment and that it is impossible to obtain measurements of viscosity of higher values than this 4,000,000 figure using this method of measurement. Even when the viscosity of a writing and marking fluid of this invention is above this 4,000,000 cps. figure, some oozing still occurs initially when the ball stops revolving, but such oozing is so little that it is not objectionable under normal circumstances.

It is considered that other physical properties of a writing or marking fluid of this invention serve in connection with the viscosity of such a fluid to effectively limit the oozing phenomena noted. Certain of these properties are the strong adhesive and strong cohesive properties of a preferred writing and marking fluid of this invention. Accurate, meaningful measurements of such properties are considered to be substantially impossible. In bulk the writing or marking fluids of this invention possess strong adhesive, strong cohesive characteristics which are substantially similar to those possessed by such common things as many types of rubber cement, a taffy candy mixture at the so-called "hard ball" stage, hot fudge at about the time of its application to ice cream and various types of animal glues when ready for applying. It will be recognized that these comparisons or descriptions are not precise since they are not set forth in a numerical sense, but they give a reasonably clear definition to the terms "strong adhesive" and "strong cohesive" properties used herein. They effectively indicate the type of cohesive, adhesive character of a preferred marking or writing fluid of this invention.

These strong adhesive, strong cohesive and viscoelastic properties are particularly apparent and important in an ink metering area as described in the preceding. It is considered that these properties are important for a marking or writing fluid in this area insofar as the prevention of oozing is concerned. The high viscosity of the fluid obviously tends to slow its moving through such areas. The strong adhesive, strong cohesive characteristics of these fluids, along with the viscoelasticity of these fluids tends to check and prevent movement of the marking or writing fluid through the ink metering area while a ball such as described in the preceding is at rest. The viscoelastic, adhesive, cohesive properties are considered to relate to what can be described as a gel or gel-type structure in the complete composition. Such a structure, while to a degree tending to permit solvent movement, blocks movement of the principal components of the marking or writing fluid in much the same manner in which a filter cake built up upon a filter tends to prevent filtration.

A surprising aspect of the invention lies in the fact that marking and writing fluid compositions of the invention can be used satisfactorily without undesirably impeding the rotation of a ball in a writing instrument. For such an instrument to be acceptable the ball in it must be capable of being rolled along a writing surface without any significant amount of force being applied to the ball so that ink can be transferred from the ball to the surface. It would logically be expected that strong adhesive and strong cohesive properties and a high viscosity of a marking or writing fluid would preclude such ease of use. However, it has been learned that satisfactory writing characteristics can be achieved with marking or writing fluids having these properties and having a viscosity even above 1,000,000 cps. when measured at 25° C. at 0.3 r.p.m. with a number 5 cylindrical spindle on a Brookfield LVT Viscometer. These higher viscosity inks may be thixotropic with the centipoise reading becoming considerably smaller as the spindle speed is increased.

The desirable characteristics of not greatly impeding the rotation of the ball and of reducing the tendency to accumulate excess ink on the outside of the ball socket are considered to be related to the film-forming characteristics of the marking or writing fluids herein described and to the ability of these fluids to wet and adhere to virtually any surface in much the same manner in which adhesives such as common rubber cement or related cements will adhere to surfaces. It is believed that these marking or writing fluids in a ball socket such as the socket 18 firmly and tenaciously form adherent, cohesive films which are low in tensile strength upon the opposed surfaces within a socket such as the surface of the socket 18 and surface of a ball such as the ball 20, but that because of the wetting of these surfaces there is an interfacial area between the films where the high shearing forces applied by rotation of the ball breaks the film resulting in comparatively little opposition to ball rotation. These adherent, cohesive film-forming properties of the marking or writing fluids of this invention are considered to be particularly important on the surface of a ball such as the ball 20, and the adhesive, cohesive flow resistant characteristics of these films have been observed on such surfaces.

On such surfaces of balls such as the ball 20 the adhesive, cohesive flow resistant characteristics of the films of marking or writing fluids as herein described developed on such balls effectively precludes these films from being "wiped off" by edges such as the edge 36 previously described even though such films possess comparatively low tensile strength, wet or dry, when compared to the tensile strength of such films which would be necessary to prevent rotation of the ball when the instrument is in use. These characteristics effectively prevent a build-up of fluid around the writing tip of a cartridge such as the cartridge 10 or 12. This is considered to be quite significant and important. It is considered that this is probably a result of the adherent, coherent films on both the surfaces of a ball such as the ball 20 and its socket such as the socket 18 resisting disruption and/or tending to space the ball so that it is not moved or shoved to one side during a writing operation so as to come in contact with an edge such as the edge 36.

These properties of the films which form on the surface of a ball such as the ball 20 with the marking or writing fluids of this invention are of such a character that they are considered to show within these films what may be referred to as significant yield values. This term "yield value" as used herein is sometimes defined as initial resistance to flow under applied stress. It is also referred to as the minimum value of shear stress which must be applied to a solution exhibiting plastic flow in order to produce flow. At times yield value is specified by an empirical formula which indicates a measure of decrease in apparent viscosity with an increase in shear speed. The yield values expressed by such a formula are considered as measures of pseudo plasticity, and are not considered to be true yield values as this term is used herein.

Because of the nature and dimensions of such films as are produced on a ball such as the ball 20 it is considered impossible to effectively and accurately measure their yield values. Significantly, it is however, possible to compare the properties of such films with those of marking or writing fluids as herein described in bulk. Many of the writing or marking fluids of this invention as herein described exhibit little or no significant or measurable yield value in bulk inasmuch as they will settle to a smooth, flat surface in time after having been deformed or agitated. However, many other of these marking or writing fluids do possess very distinct, measurable bulk yield values as can be demonstrated by the fact that they will not settle to a smooth, flat surface after having been deformed or agitated from an initial configuration.

These various physical characteristics and properties of the marking or writing fluids used in accordance with this invention are the result of formulating these fluids so as to obtain the desired physical properties. From a careful consideration of the remainder of this specification it will be realized that these physical properties can be provided in compositions utilizing an extremely wide variety of different ingredients which when combined together have characteristics as indicated.

Generally speaking any marking or writing fluid or composition useable with this invention should contain at least one solvent, at least one coloring agent, and at least one polymer which is sufficiently soluble within said solvent to provide the ultimate desired characteristics, and which in conjunction with the other ingredients of the writing fluid causes this fluid to have the viscoelastic, strong cohesive and strong adhesive, flow resistant film forming properties indicated in the preceding. It is considered impossible to state that any combination of less than all the ingredients in a writing fluid of this type will necessarily provide all of these properties although this may be the case. Generally, but not necessarily, within this type of writing or marking fluid each ingredient will have one or more physical or chemical effects upon at least one and frequently all or substantially all of the other ingredients present.

If the marking or writing fluid to be used is of a type wherein the final film to be laid down through the use of a writing instrument as herein indicated is to be soluble in water it is considered that obviously the solvent employed could be water, although this solvent may also be used in conjunction with other conventional, known water miscible solvents. With the inks of this invention which are not intended to bleed in the presence of water it is considered that the solvent or solvents used should be conventional organic fluids.

Such organic solvents are preferably chosen with reference to the solubility of one or more dyes to be used with them as coloring agents and/or with reference to their ability to serve in conjunction with any other ingredient in a writing or marking fluid as suspending agents for any pigment material used as a coloring agent. Frequently in a writing or marking fluid of the type herein indicated the solvent or solvent system used must be chosen with both of these factors taken into consideration since it is commonplace to provide both one or more dyes and a pigment or pigment-type material in an ink, the pigment or pigment-type material giving opacity to the dye in a final line of the ink.

Common solvents which may be employed in the writing fluids of this invention are various glycols such as propylene glycol, butylene glycol, ethylene glycol, octylene glycol and various analogous compounds. Usually glycols of this type tend to be somewhat hydroscopic. Since common waterfast dyes do not generally tend to go into solution in solvent or solvent systems containing even extremely small amounts of water to the degree desired to obtain as high a dye concentration as reasonably possible it is conventional to use such glycols with various non hydroscopic glycols or other solvents or in a mixture with one another.

Thus, for example, various known solvents such as ethylene glycol methyl ether, 2-methoxyethanol; ethylene glycol ethyl ether, 2-ethoxyethanol; ethylene glycol n-butyl ether, 2-butoxyethanol; diethylene glycol methyl ether, 2-(2-methoxyethoxy) ethanol; diethylene glycol ethyl ether, 2-(2-ethoxyethoxy) ethanol; dipropylene glycol methyl ether; and tripropylene glycol methyl ether may be blended with glycols as are indicated in the preceding in order to increase the solubility of one or more dyes in a solvent system and for other reasons. Comparatively long chain aliphatic acids such as oleic or 2-ethyl hexoic acid may be also added to a solvent or solvent system in order to increase solubility. Other types of solvents such as benzyl alcohol can also be used alone or in combination with various other solvents as indicated. It is obviously necessary that any solvent or solvent system employed contains solvents which are compatible with one another so as to be mutually soluble if the benefits of using a plurality of solvents are to be achieved.

Certain of the solvents indicated in the preceding also serve in a marking instrument as herein described secondary functions although they primarily act as solvents. Thus, for example, comparatively long chain aliphatic acids such as oleic acid indicated in the preceding are considered to be advantageous in a ball point marking instrument because they tend to act as lubricants for a ball such as ball 20 in socket such as the socket 18, preventing unnecessary wearing of the ball in the socket. Various secondary ingredients which, in effect, serve as a part of a solvent or solvent system in a marking fluid, but which are used primarily for other purposes may be employed. Thus, for example, hydroabietyl alcohols such as tetra-di and dehydroabietyl alcohols or mixtures thereof may be used in a marking fluid as herein indicated because they serve as tackifiers in order to promote friction between the exposed surface of a ball such as the ball 20 and a surface being written upon. These particular alcohols, however, also serve in a solvent system as solvents or solubility promoters.

Various other secondary ingredients for other purposes may, of course, be employed in a marking fluid of this invention. Such secondary ingredients may include conventional wetting agents designed to aid in putting and holding in suspension pigments used as coloring agents and/or insoluble residues from a dye or dyes employed.

It is not considered necessary to specify in this specification all of the various dyes and pigments which may be used as coloring agents in a marking or writing fluid as herein described inasmuch as such dyes and pigments are well known in the ink art. Such dyes and pigments are discussed in a number of authorities such as the text "Industrial Printing Inks," by Larsen, Reinhold Publishing Corporation, New York, N.Y., copyright 1962. Chapter 2 of this text appearing on pages 33–70 inclusive of it sets forth a good but elementary treatise as to such dyes and pigments. To supplement the disclosure the entire contents of this chapter of this Laresn text is incorporated herein by reference. From this incorporation it will be recognized that it is considered that any known dye or pigment can be formulated into a writing or marking fluid as indicated in this specification.

The properties of many of such dyes and pigments are of such a character that these dyes and pigments do not merely act as coloring agents within a writing fluid of the type described herein. Certain of such pigments such as carbon black pigments, colloidal silica, or other related pigments as various metal oxides, diatomaceous earths or the like serve as opacifiers in making an ink film relying primarily on a dye for coloring comparatively opaque. Many of such dyes and pigments by virtue of either their chemical or physical characteristics will affect viscosity and other rheological characteristics of a writing or marking fluid in one or more manners which may or may not be advantageous as far as the desired characteristics as herein explained are concerned.

A polymer used in marking or writing fluid as herein described must, of course, be soluble in a specific solvent or solvents employed in the fluid for the desired rheological characteristics to be achieved. Thus, for example, if the writing fluid is to be of a water soluble type the polymer must be soluble in water. However, in the usual instance the polyemr used must be soluble in one or more organic solvents as are employed. Because of the nature of polymers which may be used with this invention and the fact that they are of a broadly elastic type of character, the term "solubility" as used herein is not to be taken in an absolute sense. Generally speaking, these polymers will swell in the solvent or solvents employed so as to achieve a "solution" which is extremely viscous, having viscosities as indicated, and in which the viscosity is a result of cross-linking between polymer chains and/or other interaction restricting mobility of the polymer chains. Thus, the polymer or polymers employed in a writing or marking fluid do not form a free flowing, Newtonian type of liquid when dissolved. It is considered that the polymer used assists in such a fluid having a gel or gel-type physical character.

Although a polymer used in a writing or marking fluid as indicated must be of an elastic character, it must also be of such a character that a solvent solution of this polymer will form adhesive, cohesive films of a flow resistant character exhibiting yield value. Because of this a polymer as used herein must be of such character that it can be described as film forming. Because of the necessity of the adhesive and cohesive properties a polymer as used herein must also be of such a character as to be capable of being described as an adhesive forming polymer. As indicated in the preceding such a polymer should also be of an elastic or rubber-like character because of the elastic characteristics which result from the use of such a polymer in a final marking fluid.

It will be recognized that in formulating a writing fluid of the present invention the polymer used with any particular solvent or solvent system in any particular coloring agent or group of coloring agents must be chosen as to the physical properties to be achieved in the final writing fluid. Those skilled in the art of polymer and rubber chemistry will recognize that the particular physical characteristics herein described can be found in a number of different polymer structures. Because of this it is considered that it would be impossible to specify all of the acceptable polymers for use in a writing fluid of the type to which this invention pertains in this specification.

Acceptable results have been achieved in formulating writing fluids of this invention using as the polymer conventional cross-linked carboxypolymethylene type polymers. Particularly favorable results have been achieved using methyl homo polymers of acrylic acid which are believed to contain a polysaccharide serving to promote cross linking. The latter polymers are sold under the trade name "Carbopol" by the B. F. Goodrich Company, Cleveland, Ohio. All of the polymers of the type indicated in this paragraph are in the nature of carboxylic elastomers. The nature of these polymers is as indicated in Chapter 19, appearing on pages 255–267 of the text "Handbook of Adhesives" by Skeist, Reinhold Publishing Company, New York, N.Y., copyright 1962. In the interest of brevity the entire disclosure of this chapter of this text is incorporated herein by reference.

Acceptable results in writing fluids of this invention have also been achieved using cross linked acrylic emulsion copolymers such as are sold under the trade name "Acrysol" by the Rohm and Haas Company of Philadelphia, Pennsylvania. It is considered significant that these latter polymers are normally supplied containing water, and that the presence of moderate amounts of water does not appear to affect dye solubility in solvent solutions containing these polymers.

Both the "Carbopol" and the "Acrysol" type polymers are of such a character that as supplied they normally have to be admixed with an alkali neutralizing agent in order to develop the final, ultimate desired properties. Conventional agents of this type are triethanolamine, triethylamine, di(2-ethyl hexyl)amine and the like. Other neutralizing agents such as sodium hydroxide, ammonium hydroxide and the like can be utilized. Such bases are normally used in formulation in order to produce in situ thickening after all of the other ingredients have been blended together, such thickening serving to develop the ultimate desired properties.

Acceptable results can also be achieved in using as a polymer polyvinylpyrrolidone. When this particular polymer is utilized it is generally utilized with a pigment material such as any of the various known types of carbon black in order to develop the ultimate desired properties. This particular polymer is known to be an effective dispersant for solids of this type. This particular polymer, particularly when of a comparatively low molecular weight, generally serves in part as a solvent. It has been shown that the viscosities of suspensions of carbon black in various types of solvents are considerably greater than expected and that such viscosities correspond to absorption around each carbon particle, and that they apparently relate to presently incompletely understood polymer to carbon black bonds of some type.

It is to be noted that all of the polymers specifically indicated herein are of a water tolerant character and that they either are soluble in water or that they are capable of swelling to a significant degree in water. This is considered to be particularly important in enabling the marking or writing fluids of this invention to be of a water tolerant character, such that the writing properties of writing instruments as herein described are not detrimentally affected by the presence of moisture within reasonable amounts on a writing surface such as the surface of a piece of paper.

It is also to be noted that all of the polymers specifically indicated herein are suspending agents and are closely related to or are in the nature of common, known elastomers. Thus, for example, polyvinylpyrrolidone is known to form a type of synthetic rubber. Similarly, both modified and unmodified polyacrylate rubbers form a class of well known synthetic rubbers. These facts are considered to evidence the propriety of the use of the term "elastomer" in describing the polymers used as herein described and the solutions of these polymers as used herein as marking fluids.

Because of the fact that each of the ingredients in a marking fluid of this invention normally has a tendency to interact with and upon each of the other ingredients so as to affect final desired physical properties it is considered impossible to accurately state that a marking or writing fluid as herein explained should have any specific content of each of the different types of ingredients used in the fluid. Generally speaking, the coloring agent in such a marking fluid will be no greater than about 60% by weight of the weight of the total composition. In general as much coloring agent or agents should be used as can be placed in solution and/or suspension without causing a marking fluid to lose physical properties as described. Generally, such a marking fluid as herein indicated should contain no more than about 70% by weight of solvent or solvent mixture since if more of the solvent or solvent mixture is used it is considered that the properties of the solvent will predominate in the final composition, detrimentally affecting the physical properties desired as described in the preceding.

It is considered that at least 0.1% by weight and up to about 60% by weight of a marking fluid composition should be the polymer or polymer composition used in this fluid. If too little of the polymer or polymer composition is employed, the desired physical properties will not be achieved, while if an excess is used the marking fluid will tend to have an unuseable viscosity. These percentages by weight of the polymer or polymer composition are to be taken as including any necessary secondary ingredients such as neutralizing agents which have to be used with certain polymers as herein described in order to develop ultimate physical characteristics.

On the basis of these considerations those skilled in the art will be able to formulate and manufacture a number of different marking or writing fluids having physical properties as described. The actual manufacture of such marking fluids normally will follow known, established techniques in the art of ink manufacture. Generally speaking, the ingredients are added together in the order of solvent, coloring agent or agents, and polymer composition, and then are mixed and/or thoroughly milled so as to achieve the desired ultimate properties. When a neutralizing agent is used to achieve these ultimate properties it is normally preferred to add such an agent last so as to facilitate the blending of the various ingredients.

The following specific examples are given in order to aid those skilled in the art of this invention in understanding the nature of this invention and in formulating these and other suitable marking or writing compositions. It is to be understood that these examples are only examples, and are not to be taken as limiting this invention in any respect.

Example 1

A marking composition was prepared by mixing the following ingredients in the order named while maintaining the temperature of the mixture at 90° C. After all ingredients were added, the mixture was stirred for two hours while being maintained at this temperature.

| | Percent by weight |
|---|---|
| Propylene glycol | 43 |
| Octylene glycol | 10 |
| Carboxyvinyl polymer (Carbopol 934 sold by B. F. Goodrich Chemical Company, Cleveland, Ohio. Specific gravity 1.41; moisture content less than 2% by weight) | 2 |
| Diortho tolyl guanidine | 3 |
| Methyl violet base dye (Du Pont Company, Wilmington, Del.) | 4 |
| Victoria Blue B Base dye (Du Pont Company, Wilmington, Del.) | 10 |
| Du Pont Luxol Fast Blue MBSN (Du Pont Company, Wilmington, Del.) | 25 |
| Oleic acid | 3 |

This writing fluid exhibited a viscosity of over 4 million cps. at 25° C. with a No. 5 cylindrical spindle at 0.3 r.p.m. on a Brookfield viscometer. This ink is highly thixotropic.

Example 2

A marking composition was prepared by mixing the following ingredients in the order named while maintaining the temperature of the mixture at 90° C. After all ingredients were added, the mixture was stirred for two hours while being maintained at this temperature.

| | Percent by weight |
|---|---|
| Propylene glycol | 45.5 |
| Octylene glycol | 10.0 |
| Carboxyvinyl polymer (as described in Example 1) | 2.0 |
| Diortho tolyl guanidine | 3.0 |
| Methyl violet base dye (as described in Example 1) | 4.0 |
| Victoria Blue B Base dye (as described in Example 1) | 10.0 |
| Du Pont Luxol Fast Blue MBSN (as described in Example 1) | 25.0 |
| Carbon black (Carbolac 2 produced by Cabot Corp., Boston, Mass.) | 0.5 |

This writing fluid exhibited a viscosity of over 4 million cps. at 25° C. with a No. 5 cylindrical spindle at 0.3 r.p.m. on a Brookfield viscometer. This ink is highly thixotropic.

Example 3

A marking composition was prepared by first mixing together the following ingredients in order to form a mixture A.

| | Percent by weight |
|---|---|
| A mixture of tetra, di and dehydro abietyl alcohols having a Gardner color less than 1, a hydroxyl content of 4.85 and a saponification number of 15 max. (As sold under the trade name "Abitol" by the Hercules Powder Company, Wilmington, Del.) | 6.0 |
| Propylene glycol | 24.0 |
| Octylene glycol | 10.0 |
| Carboxy vinyl polymer (as described in Example 1) | 1.5 |
| Diortho tolyl guanidine | 0.5 |
| Polyvinyl pyrrolidone (as sold by General Aniline and Film Corp. under the trademark "K-90" having an average molecular weight of 360,000) | 3.0 |
| Diisopropanolamine | 2.0 |
| Du Pont Rhodamine BI Base dye (Du Pont Company, Wilmington, Del.) | 20.0 |
| Du Pont Luxol Fast Yellow TN dye (Du Pont Company, Wilmington, Del.) | 15.0 |
| Du Pont Luxol Fast Red L dye (Du Pont Company, Wilmington, Del.) | 10.0 |

A mixture B was then prepared by mixing the following ingredients:

| | Percent by weight |
|---|---|
| Carboxyvinyl polymer gel | 5.0 |
| This gel consisting of: | |
|     Carboxyvinyl polymer (as described in Example 1) | 3 |
|     Propylene glycol | 94 |
|     Diisopropanolamine | 3 |
| Graphite dispersion (as sold under the trade designation EC-1823 B by Acheson Colloids of Port Haven, Michigan, consisting of 20% by weight of graphite in butylene glycol) | 5.0 |
| Carbon black (as sold by Cabot Corp., Boston, Mass., under the trade name Elftex 5) | 0.5 |

To 100 parts by weight of Mixture A 10% parts by weight of Mixture B was added. The composition was then thoroughly mixed so as to produce a writing fluid which exhibited a viscosity of 54,000 cps. at 25° C. with a No. 4 cylindrical spindle at 0.3 r.p.m. on a Brookfield viscometer. This ink is significantly thixotropic.

Example 4

A marking composition was prepared by mixing the following ingredients in the order named while maintaining the temperature of the mixture at 90° C. After all ingredients were added, the mixture was stirred for two hours while being maintained at this temperature.

| | Percent by weight |
|---|---|
| A mixture of tetradidehydro abeityl alcohols (as described in Ex. 3) | 4.85 |
| Propylene glycol | 36.00 |
| Carboxyvinyl polymer (as described in Example 1) | 1.45 |
| Diortho tolyl guanidine | 0.60 |
| Oleic acid | 8.10 |
| Diisopropanolamine | 1.84 |
| Polyvinylpyrrolidone (as described in Example 3) | 0.50 |
| Methyl violet base (as described in Example 1) | 7.27 |
| Victoria Blue B Base | 1.62 |
| Du Pont Ink Blue DG (Du Pont Company, Wilmington, Del.) | 1.62 |
| Du Pont Luxol Fast MBSN (as described in Example 1) | 24.24 |
| Graphite dispersion (as described in Example 3) | 3.40 |
| Carbon black (as described in Ex. 3) | 0.50 |

This writing fluid exhibited a viscosity of 800,000 cps. at 25° C. with a No. 4 cylindrical spindle at 0.3 r.p.m. on a Brookfield viscometer. This ink is highly thixotropic.

Example 5

A marking composition was prepared by mixing the following ingredients in the order named while maintaining the temperature of the mxiture at 90° C. After all ingredients were added, the mixture was stirred for two hours while being maintained at this temperature.

| | Percent by weight |
|---|---|
| Ethylene glycol phenyl ether | 41.60 |
| 2-ethyl hexoic acid | 17.20 |
| Polyvinyl pyrrolidone (as described in Example 3) | 0.24 |
| Nubian Resin Black dye (Allied Chemical Corp., New York, N.Y.) | 36.20 |
| Carbon black (as described in Example 2) | 4.76 |

This writing fluid exhibited a viscosity of 70,000 cps. at 25° C. with a No. 4 cylindrical spindle at 0.6 r.p.m. on a Brookfield viscometer. This ink is not significantly thixotropic.

Example 6

A marking composition was prepared by mixing the following ingredients in the order named while maintaining the temperature of the mixture at 90° C. After all ingredients were added, the mixture was stirred for two hours while being maintained at this temperature.

| | Percent by weight |
|---|---|
| Propylene glycol | 30.0 |
| Benzyl alcohol | 30.0 |
| Polyvinyl pyrrolidone (as described in Example 3) | 2.0 |
| A mixture of tetra, di and dehydro abietyl alcohols as described in Example 3) | 5.0 |
| Du Pont Luxol Fast Blue MBSN (as described in Example 1) | 10.0 |
| Du Pont Luxol Fast Blue ARN (Du Pont Company, Wilmington, Del.) | 10.0 |
| Victoria Blue B Base dye (as described in Example 1) | 3.0 |
| Colloidal titanium dioxide (as sold by Cabot Corp., Boston, Mass., under the designation P-25) | 10.0 |

This writing fluid exhibited a viscosity of 94,000 cps. at 29° C. with a No. 4 cylinder spindle at 0.3 r.p.m. on a Brookfield viscometer. This ink is significantly thixotropic.

Example 7

A marking composition was prepared by mixing the following ingredients in the order named while maintaining the temperature of the mixture at 90° C. After all ingredients were added, the mixture was stirred for two hours while being maintained at this temperature.

| | Percent by weight |
|---|---|
| A mixture of tetra, di and dehydro abietyl alcohols (as described in Example 3) | 23.0 |
| 1-3 butylene glycol | 13.0 |
| Octylene glycol | 17.0 |
| Oleic acid | 4.0 |
| Diortho tolyl guanidine | 1.0 |
| Polyinyl pyrrolidone (as described in Example 3) | 0.5 |
| Methyl violet base dye (as described in Example 1) | 4.0 |
| Victoria Blue BO dye (Du Pont Company, Wilmington, Del.) | 9.5 |
| Du Pont Luxon Fast Blue MBSN (as described in Example 1) | 24.0 |
| Colloidal silica (as sold by the Cabot Corp., Boston, Mass., under the designation Caboisil EH5) | 3.0 |

This writing fluid exhibited a viscosity of 874,000 cps. at 28° C. with a No. 4 cylindrical spindle at 0.3 r.p.m. on a Brookfield viscometer. This ink is highly thixotropic.

Example 8

A marking composition was prepared by mixing the following ingredients in the order named while maintaining the temperature of the mixture at 90° C. After all ingredients were added the mixture was stirred for two hours while being maintained at 50° C.

| | Percent by weight |
|---|---|
| Tripropylene glycol methyl ether | 16.0 |
| Benzyl alcohol | 40.0 |
| Du Pont Luxol Fast Blue MBSN (as described in Example 1) | 10.0 |
| Du Pont Luxol Fast Blue ARN (as described in Example 6) | 10.0 |
| Victoria Blue B Base dye (as described in Example 1) | 3.0 |
| Cross-linked acrylic emulsion copolymer (as sold by the Rohm and Haas Co., Philadelphia, Penn. as Acrisol ASE-60 containing 28.0±5% polymer in water, pH approximately 3.5, specific gravity 1.054 at 25° C.) | 20.0 |
| Triethanolamine, sufficient to adjust the pH to the mixture to approx. 8. | |

This writing fluid exhibited viscosity of 1,560,000 cps. at 28° C. with a No. 5 cylindrical spindle at 0.3 r.p.m. on a Bookfield viscometer. This ink is thixotropic.

Example 9

A marking composition was prepared by mixing the following ingredients in the order named while maintaining the temperature of the mixture at 90° C. After all ingredients were added, the mixture was stirred for two hours while being maintained at 50° C.

| | Percent by weight |
|---|---|
| Tripropylene glycol methyl ether | 15.0 |
| Benzyl alcohol | 29.0 |
| A mixture of tetra, di and dehydro abietyl alcohol (as described in Example 3) | 4.0 |
| Polyvinylpyrrolidone (as described in Example 3) | 2.0 |
| Du Pont Luxol Fast Blue MBSN (as described in Example 1) | 15.0 |
| Du Pont Luxol Fast Blue ARN (as described in Example 6) | 15.0 |
| Victoria Blue B Base dye (as described in Example 1) | 5.0 |
| Cross-linked acrylic emulsion co-polymer (as described in Example 8) | 15.0 |
| Sodium hydroxide solution (containing 20% sodium hydroxide by weight in water as a solvent), sufficient to adjust the pH of the mixture to approx. 8. | |

This writing fluid exhibited a vicosity of 3,174,000 cps. at 28° C. with a No. 5 cylindrical spindle at 0.3 r.p.m. on a Brookfield viscometer. This ink is thixotropic.

We claim:
1. A ball point marking instrument which includes:
   a sealed marking fluid reservoir having a socket located at one of the extremities thereof;
   a ball rotatably mounted within said socket so as to extend into the interior of and to the exterior of said reservoir;
   a marking fluid within said fluid reservoir in contact with said ball;
   a charge of pressurized gas within said reservoir at the extremity thereof remote from said socket, said pressurized gas serving to force said marking fluid against said ball;
   said marking fluid being a viscoelastic, strongly cohesive, strongly adhesive, film-forming composition comprising a mixture of at least one solvent, at least one coloring agent, and at least one elastomeric-type polymer which is soluble in said solvent, said polymer being selected from the group consisting of carboxypolymethylene type polymers, cross-linked acrylic acid emulsion copolymers, and polyvinylpyrrolidone polymers.

2. A ball point marking instrument as defined in claim 1 wherein said marking fluid has an apparent viscosity of at least 50,000 cps. at 25° C.

3. A ball point marking instrument as defined in claim 1 wherein said marking fluid has an apparent viscosity in excess of 1,000,000 cps. at 25° C., and is thixotropic.

4. A ball point marking instrument having a sealed marking fluid reservoir, a socket located at an extremity of this reservoir so as to extend between the interior and the exterior of the reservoir, a ball rotatably mounted in said socket so as to extend into the interior of and to the exterior of said reservoir, a marking fluid in said reservoir in contact with said ball, the improvement comprising:
   said marking fluid being a viscoelastic composition having strong adhesive and strong cohesive and film-forming characteristics;
   said marking fluid being capable of wetting the surface of said ball and forming on the surface of said ball a film which is sufficiently flow-resistant so that said means is substantially incapable of forcing said marking fluid from the interior of said reservoir to the exterior of said reservoir between said ball and the interior of said ball socket when said ball is at rest;
   said marking fluid also being capable of wetting said ball and forming on the surface of said ball an adherent, cohesive film which is not visibly disrupted by contact with the entrance to said ball socket on the exterior of said reservoir upon rotation of said ball, such film being capable of being transferred from said ball to a marking fluid receiving surface;
   said marking fluid comprising a mixture of at least one solvent, at least one coloring agent, and at least one polymer which is soluble within said solvent and which, in conjunction with the other ingredients of said marking fluid, causes said marking fluid to have its viscoelastic, strong cohesive, strong adhesive and flow-resistant, film-forming properties;
   a charge of pressurized gas within said reservoir at the exterior end thereof remote from said socket, said pressurized gas serving to force said marking fluid against said ball.

5. A ball point marking instrument as defined in claim 4 wherein said pressurized gas means comprises a body of pressurized gas and including a piston means fitting closely within the interior of said reservoir and separating said body of pressurized gas from said marking fluid, said piston means being capable of moving along the length of said reservoir in contact with said marking fluid because of the pressure of said pressurized gas means during consumption of marking fluid from said ball point marking instrument.

6. A ball point marking instrument as defined in claim 4 wherein:
   there is a metering band in said ball socket in which said ball is held; and
   wherein the length of said metering band measured along the curvature of said ball is at least 100 microns in length; and
   wherein each side of said ball is spaced from the interior of said ball socket within said metering band a distance of about 2 to about 12 microns; and
   wherein said charge of pressurized gas comprises a body of gas under pressure, said body of gas being capable of exerting a pressure within said reservoir of at least 1.0 p.s.i.g. at −10° C. when the marking fluid within said reservoir is substantially exhausted because of the consumption of said marking fluid within said instrument;
   said body of gas having a pressure of not to exceed 200 p.s.i.g. at 20° C. within said reservoir; and
   wherein said marking fluid has an apparent viscosity in excess of 1,000,000 cps. at 25° C.; and
   wherein said polymer is a film-forming elastic composition, said polymer selected from the group consisting of carboxymethylene type polymers, cross-linked acrylic acid emulsion copolymers, and polyvinylpyrrolidone polymers.

7. A ball point marking instrument as defined in claim 6 wherein said polymer is a carboxypolymethylene type polymer.

8. A ball point marking instrument as defined in claim 6 wherein said polymer is a cross-linked acrylic acid emulsion copolymer.

9. A ball point marking instrument as defined in claim 6 wherein said polymer is a polyvinylpyrrolidone polymer.

References Cited

UNITED STATES PATENTS

| | | | |
|---|---|---|---|
| 2,715,388 | 8/1955 | Cofield et al. | 401—217 |
| 2,853,972 | 9/1958 | Cofield | 401—217 |
| 3,000,354 | 9/1961 | Germann | 401—188 X |
| 3,099,252 | 7/1963 | Cofield | 401—157 |
| 3,130,711 | 4/1964 | Eckerle | 401—188 |

LAWRENCE CHARLES, *Primary Examiner.*

U.S. Cl. X.R.

106—22, 23, 27, 30; 401—212, 216 ity of reference# REEXAMINATION CERTIFICATE (288th)

United States Patent [19]

Fisher et al.

[11] B1 3,425,779

[45] Certificate Issued  Dec. 25, 1984

[54] PRESSURIZED MARKING INSTRUMENT

[75] Inventors: Paul C. Fisher, 14226 W. Greenleaf St., Sherman Oaks, Calif. 91403; Herman Schub, Chicago; Roger A. Kennedy, Addison, both of Ill.

[73] Assignee: Paul C. Fisher, Sherman Oaks, Calif.

Reexamination Request:
No. 90/000,427, Jul. 29, 1983

Reexamination Certificate for:
Patent No.: 3,425,779
Issued: Feb. 4, 1969
Appl. No.: 660,155
Filed: Jul. 24, 1967

Related U.S. Application Data

[63] Continuation-in-part of Ser. No. 576,721, Sep. 1, 1966.

[51] Int. Cl.³ .............................................. C09D 11/10
[52] U.S. Cl. .................................... 401/190; 106/22; 106/23; 106/27; 106/30; 401/212; 401/216

[56] References Cited

U.S. PATENT DOCUMENTS

| | | |
|---|---|---|
| 2,265,055 | 12/1938 | Biro . |
| 2,416,145 | 2/1947 | Biro . |
| 2,852,397 | 9/1958 | Goessling . |
| 2,882,172 | 4/1959 | Scobel . |
| 2,955,058 | 10/1960 | Foster . |
| 3,000,354 | 9/1961 | Germann . |
| 3,035,004 | 5/1962 | Glavis . |
| 3,037,881 | 6/1962 | McDowell . |
| 3,043,787 | 7/1962 | Bonvicini et al. . |
| 3,074,800 | 1/1963 | Germann . |
| 3,099,252 | 7/1963 | Cofield, Jr. . |
| 3,319,331 | 3/1967 | Fehling et al. . |
| 3,440,086 | 4/1967 | Kerns . |

FOREIGN PATENT DOCUMENTS

| | | |
|---|---|---|
| 167753 | 2/1951 | Austria . |
| 202896 | 4/1959 | Austria . |
| 538066 | 5/1955 | Belgium . |
| 669112 | 9/1964 | Belgium . |
| 734737 | 4/1943 | Fed. Rep. of Germany . |
| 904034 | 2/1949 | Fed. Rep. of Germany . |
| 1043550 | 11/1958 | Fed. Rep. of Germany . |
| 1070381 | 12/1959 | Fed. Rep. of Germany . |
| 1027093 | 5/1953 | France . |
| 1126901 | 12/1956 | France . |
| 1138908 | 7/1957 | France . |
| 1232706 | 10/1960 | France . |
| 1306107 | 9/1962 | France . |
| 32-5963 | 8/1957 | Japan . |
| 33-1275 | 2/1958 | Japan . |
| 37-11572 | 8/1962 | Japan . |
| 39-27676 | 12/1964 | Japan . |
| 77121 | 1/1955 | Netherlands . |
| 78924 | 9/1955 | Netherlands . |
| 164128 | 7/1958 | Sweden . |
| 336144 | 3/1959 | Switzerland . |
| 377967 | 7/1964 | Switzerland . |
| 397927 | 2/1966 | Switzerland . |
| 621847 | 4/1949 | United Kingdom . |
| 786777 | 11/1957 | United Kingdom . |
| 880473 | 10/1961 | United Kingdom . |

OTHER PUBLICATIONS

Chemical Abstracts, vol. 61, Abstract No. 14475–6, (1964).
Chemical Abstracts, vol. 62, Abstract No. 6623, (1965).
C&E News, vol. 36, No. 39, pp. 64–65, (9/29/58).
GAF Chemicals Catalog AP–137–2, pp. 18–19, (1964).
Chemical Week 1983 Buyer's Guide, Oct. 1982, p. 607.
Billmeyer, Textbook of Polymer Science, (Interscience Publisher's, 1962), pp. 15–17.
Ferry, *Viscoelastic Properties of Polymers*, (John Wiley & Sons, 1961), pp. 1–40, 82–104, 404–408.
Hawley, *The Condensed Chemical Dictionary*, 10th Ed., (Van Nostrand Reinhold, 1981), p. 1021.
Ward, *Mechanical Properties of Solid Polymers*, (John Wiley & Sons, 1971), pp. 188–192.
*Webster's New Collegiate Dictionary*, (Merriam-Webster, 1981), pp. 362, 1298.

*Primary Examiner*—Paul R. Michl

[57] ABSTRACT

A ball point writing and/or marking instrument is disclosed. This instrument has a sealed marking fluid reservoir, a ball socket located in an extremity of the reservoir so as to extend between the interior and the exterior of the reservoir, a ball rotatably mounted in the socket so as to extend between the interior and exterior of the reservoir, a marking fluid in the reservoir in contact with the ball, and a pressurized gas within the reservoir forcing the marking fluid into contact with the ball. The marking fluid comprising a mixture of at least one solvent, at least one coloring agent and at least one polymer which is "soluble" with the solvent and which, in conjunction with the other ingredients within the fluid, causes the marking fluid to be viscoelastic and to have strong adhesive and strong cohesive characteristics and to flow resistant in character. The marking fluid has a high viscosity; it is capable of wetting the surface of the ball and forming on the ball a film which is sufficiently flow resistant so that when the ball is at rest the marking fluid does not ooze out of the reservoir. However, this film is capable of being transferred from the ball to a receiving surface when the ball is located by contact with such a surface without being visibly disrupted by contact with the entrance to the ball socket.

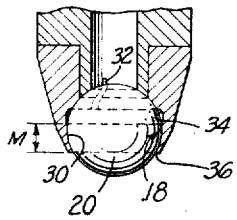

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-9 is confirmed.

* * * * *